(12) United States Patent
Salahshoor et al.

(10) Patent No.: US 7,337,237 B2
(45) Date of Patent: Feb. 26, 2008

(54) MECHANISM TO PROVIDE CALLBACK CAPABILITIES FOR UNREACHABLE NETWORK CLIENTS

(75) Inventors: Mohamad Reza Salahshoor, Raleigh, NC (US); Balan Subramanian, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 10/272,313

(22) Filed: Oct. 16, 2002

(65) Prior Publication Data

US 2004/0078486 A1    Apr. 22, 2004

(51) Int. Cl.
*G06F 15/16* (2006.01)
(52) U.S. Cl. .............. 709/245; 709/248; 709/241; 719/330
(58) Field of Classification Search ............. 709/201, 709/205, 206, 227, 217, 248, 241, 245; 719/330
See application file for complete search history.

(56) References Cited

U.S. PATENT DOCUMENTS

| | | | | |
|---|---|---|---|---|
| 5,787,281 | A | 7/1998 | Schreiber et al. | 395/684 |
| 5,819,019 | A | 10/1998 | Nelson | 395/182.02 |
| 6,049,800 | A | 4/2000 | Govindarajan et al. | 707/10 |
| 6,178,529 | B1 * | 1/2001 | Short et al. | 714/51 |
| 6,219,087 | B1 | 4/2001 | Uiterwyk et al. | 348/14.08 |
| 6,289,384 | B1 | 9/2001 | Whipple et al. | 709/229 |
| 6,321,249 | B1 | 11/2001 | Nesbitt | 709/202 |
| 6,349,336 | B1 | 2/2002 | Sit et al. | 709/227 |
| 6,393,015 | B1 | 5/2002 | Shtivelman | 370/352 |
| 6,542,900 | B1 * | 4/2003 | Xia | 707/103 Y |
| 6,606,647 | B2 * | 8/2003 | Shah et al. | 709/206 |
| 6,916,247 | B2 * | 7/2005 | Gatto et al. | 463/42 |
| 7,017,162 | B2 * | 3/2006 | Smith et al. | 719/328 |
| 7,028,312 | B1 * | 4/2006 | Merrick et al. | 719/330 |
| 2003/0005181 | A1 * | 1/2003 | Bau et al. | 709/330 |
| 2003/0023957 | A1 * | 1/2003 | Bau et al. | 717/140 |
| 2003/0093500 | A1 * | 5/2003 | Khodabakchian et al. | 709/219 |
| 2003/0206192 | A1 * | 11/2003 | Chen et al. | 345/733 |
| 2003/0225840 | A1 * | 12/2003 | Glassco et al. | 709/206 |

* cited by examiner

*Primary Examiner*—Nathan Flynn
*Assistant Examiner*—Mohammad Siddiqi
(74) *Attorney, Agent, or Firm*—Bockhop & Associates, LLC

(57) ABSTRACT

A system and method for delivering asynchronous callbacks from a network server to clients that are unreachable by the network server. The system provides a callback server that receives callback registration requests from clients. The callback server generates a web service based on the description of the service that is being invoked by the client and an associated URL address based on its own address. The network server uses the dynamically generated service accessible at this URL address to deliver the asynchronous callbacks. The callbacks are either delivered to the clients by the callback server, if they are reachable inside the network domain, or made available on the callback server for the clients to poll. In addition, the callback server provides functionality that may be too expensive for the clients to provide locally.

23 Claims, 9 Drawing Sheets

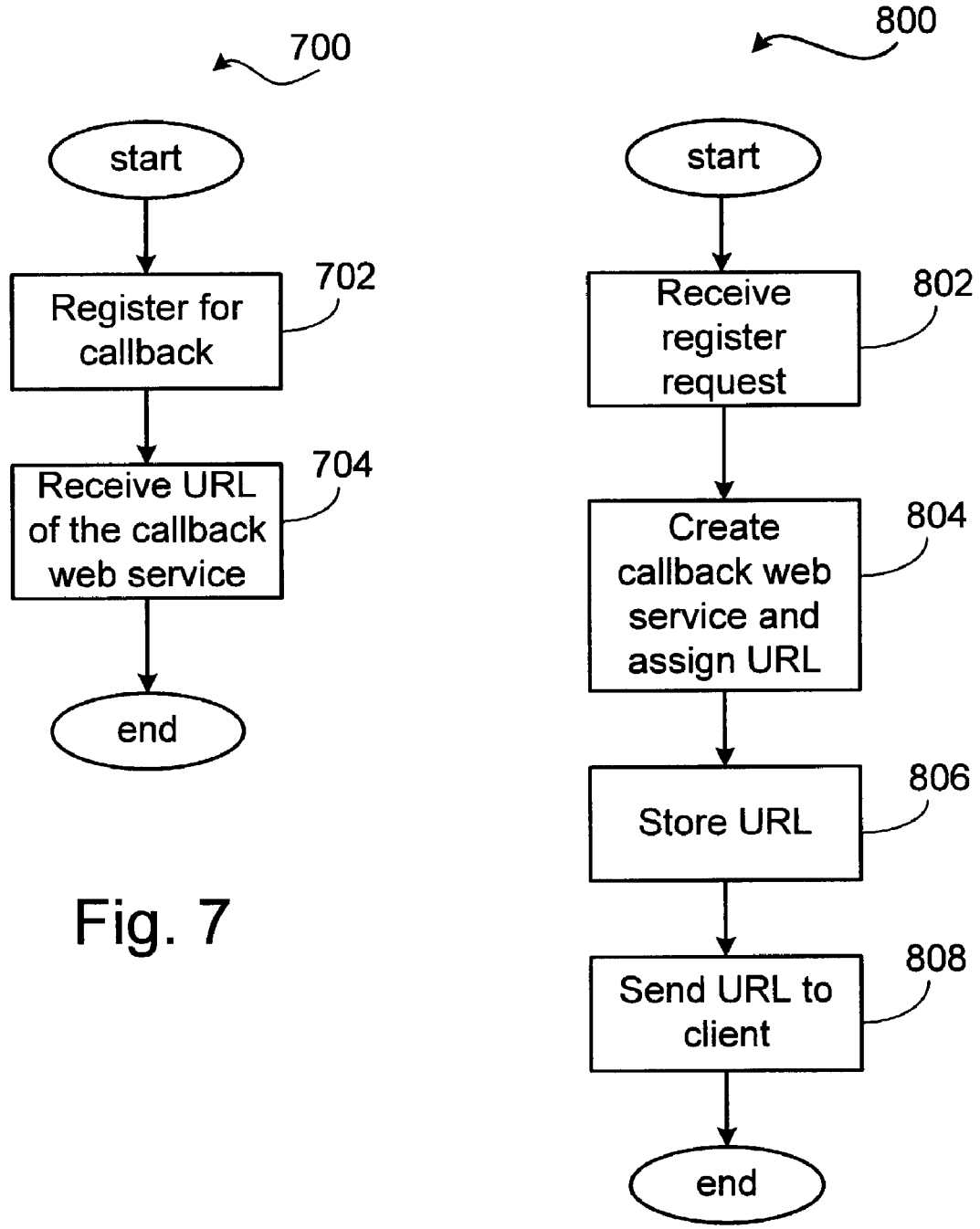

MECHANISM TO PROVIDE CALLBACK CAPABILITIES FOR UNREACHABLE NETWORK CLIENTS

FIELD OF INVENTION

The present invention relates to communications networks and, more specifically, to asynchronous communications across a network.

BACKGROUND

Callbacks are asynchronous mechanisms used in a client-server environment for a network server to return services or information requested by a client. However, callbacks are not easily accomplished in a services oriented environment because the client who is requesting the service and the network server that provides the service may not be located within the same network domain. In addition, their communication may be restricted in a complex yet common case by firewalls or because the client may not have a fixed Internet Protocol (IP) address or its IP address may be translated through Network Address Translation (NAT) by an intermediate server or a combination of these common mechanisms.

FIG. 1 depicts a prior art of a network 104 supporting a client-server configuration. The clients 106 can request services and information from a remote network server 102. When the request is synchronous, the network server 102 delivers the result on the same connection between the client and the network server. When the request is asynchronous, the network server 102 makes a new connection to the client 106 to deliver callback results.

For example, a client requiring an asynchronous callback can register with a web service using Simple Object Access Protocol (SOAP) over HyperText Transfer Protocol (HTTP) message requests and asks for services that provide a client notification operation. To get callback results the client has to continuously poll the network server with messages (assuming that the network server maintains state for the registered client) to check for callback results or run a web service engine accessible by the network server to send a SOAP message back with the callback results.

Polling is inherently slow. The situation is further undesirable when polling has to take place across the Internet, because the polling increases unnecessary network traffic and further slows down the communication. Further, some applications might require immediate notification once the results of a call become available via callback, and higher polling frequency would be required for this situation. High polling frequency worsens the problem of additional unnecessary network traffic and subsequent congestion. Moreover, constant polling by clients reduces the efficiency of the network server because it has to spend Central Processing Unit (CPU) cycles to accept a polling request, to check its internal data structures to see if there is indeed a response for that particular client, and to produce a response to the polling request. Loss of the network server's efficiency prevents the network server from responding quickly to legitimate requests from new clients, which, in turn, restricts the scalability of the network server supporting callbacks. The worst polling scenario is when the response takes a long while to be generated on the network server but the client needs immediate notification of the response as soon as it is generated, which implies high frequency polling and a heavy load on the network server resulting from polling requests.

Alternatively, when the client registers for notification, it can leave behind an Universal Resource Locator (URL) address for the network server to send back a SOAP message to after the results become available as illustrated in FIG. 2. FIG. 2 is a prior art illustrating an asynchronous callback request from the client 106 to a network server 102 located remotely on the Internet. The client 106 sends a request 204 to the network server 102, whereby the request includes a callback network address (callback URL). The network server 102 delivers the response 214 to the network address specified by the client 106.

The other approach to handle asynchronous callbacks is to mount a web service engine on the client and to provide the client's URL address to the network server when the client registers for notification with the network server. However, FIG. 3 is a prior art illustrating this approach is inadequate if the client is behind a NAT/firewall 302, where the NAT/firewall 302 is a network isolation mechanism. Further, the current trend is to support thin clients, i.e., clients with limited resources, and the idea of running a web service engine on a client to support callback mechanisms is exaggerated and may restrict the users of a particular service.

However, leaving a URL address for return of SOAP messages on the network server, when the network server is not in the same network domain as the client as illustrated in FIG. 3 and when the client is not publicly accessible, causes problems, because the client can reach the network server but the network server cannot reach the client. FIG. 4 is a prior art illustrating callback problems for clients located behind a firewall 302. Client A 402 is a regular client that cannot be reached by an outside network server; client B 404 is a web server that is permitted to receive information from the outside network server due to firewall configuration; client C 406 is a web server but it is behind a NAT mechanism and not registered with a public domain name server (DNS) and hence inaccessible from outside the network domain. Callback 414 for client A 402 cannot be delivered because client A's callback URL is blocked by the firewall 302; callback 416 for client B 404 is delivered without any problem but this requires additional resources on the client B, which is an undesirable requirement for thin clients; callback 418 cannot be delivered because the callback URL is local to the network domain and hence not accessible from outside of the network domain.

SUMMARY

The present invention enables asynchronous callbacks from a network server to a client in a loosely coupled service oriented environment, where the client registers with a callback server and will be notified by the callback server when the results of the client's request (which established the return end point for callback as well) become available. Alternatively, the client may poll the callback server to get the results, thereby restricting polling to the local network domain, which is less expensive than polling across network domains.

The present invention provides a callback server at the edge of a network domain, where the callback server can be accessed by clients within the network domain and the callback server can also receive communications from network servers located outside the network domain.

The client looking for services from a network server located outside of the network domain first registers with the callback server. The callback server registers the client, dynamically generates a service based on the service description of the client's target service with a specific URL, and returns the specific URL to the client. The client includes this specific URL as the callback address in its requests for service that it directly transmits to the network server. Alternatively, the service requests from the client are forwarded by the callback server to the network server. The client closes the communication channel to the network server once the request has been sent.

After the network server generates a response, the network server invokes the service at the callback URL specified by the client and delivers the response to this service through a standard service invocation.

The callback server receives the response and delivers the response to the client, if the client has a reachable fixed IP address. When the client is not reachable, the callback server caches the response and waits for the client to poll for the response.

Other advantages and features of the present invention will become apparent after review of the hereinafter set forth Brief Description of the Drawings, Detailed Description of the Invention, and the Claims.

DESCRIPTION OF THE DRAWINGS

FIG. 7 is a flow chart of a client registration process.

FIG. 8 is a flow chart of a callback server registration process.

DETAIL DESCRIPTION OF THE INVENTION

Figure 1:
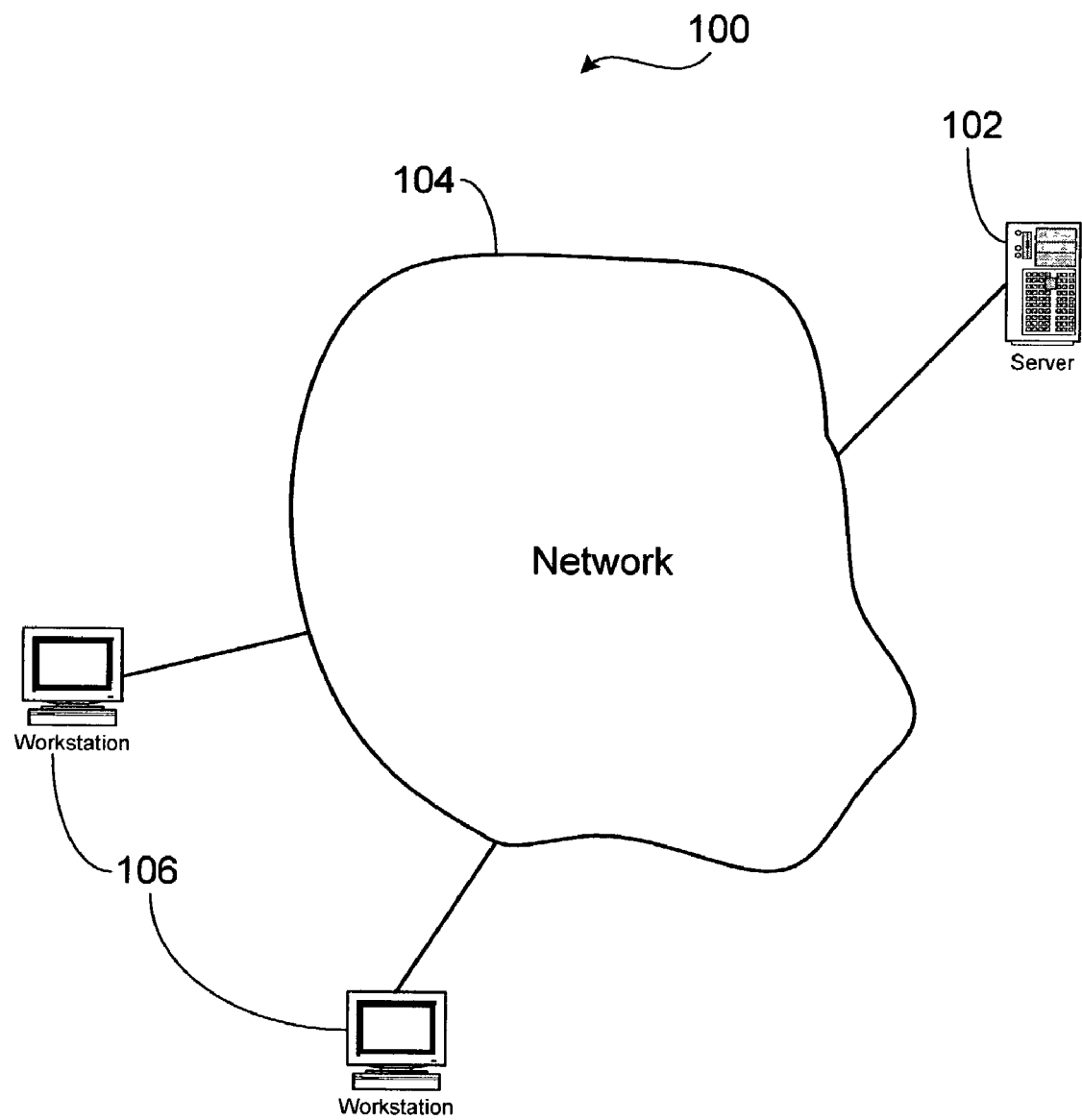
FIG. 1 illustrates a prior art network architecture supporting client-server configuration.
Figure 2:
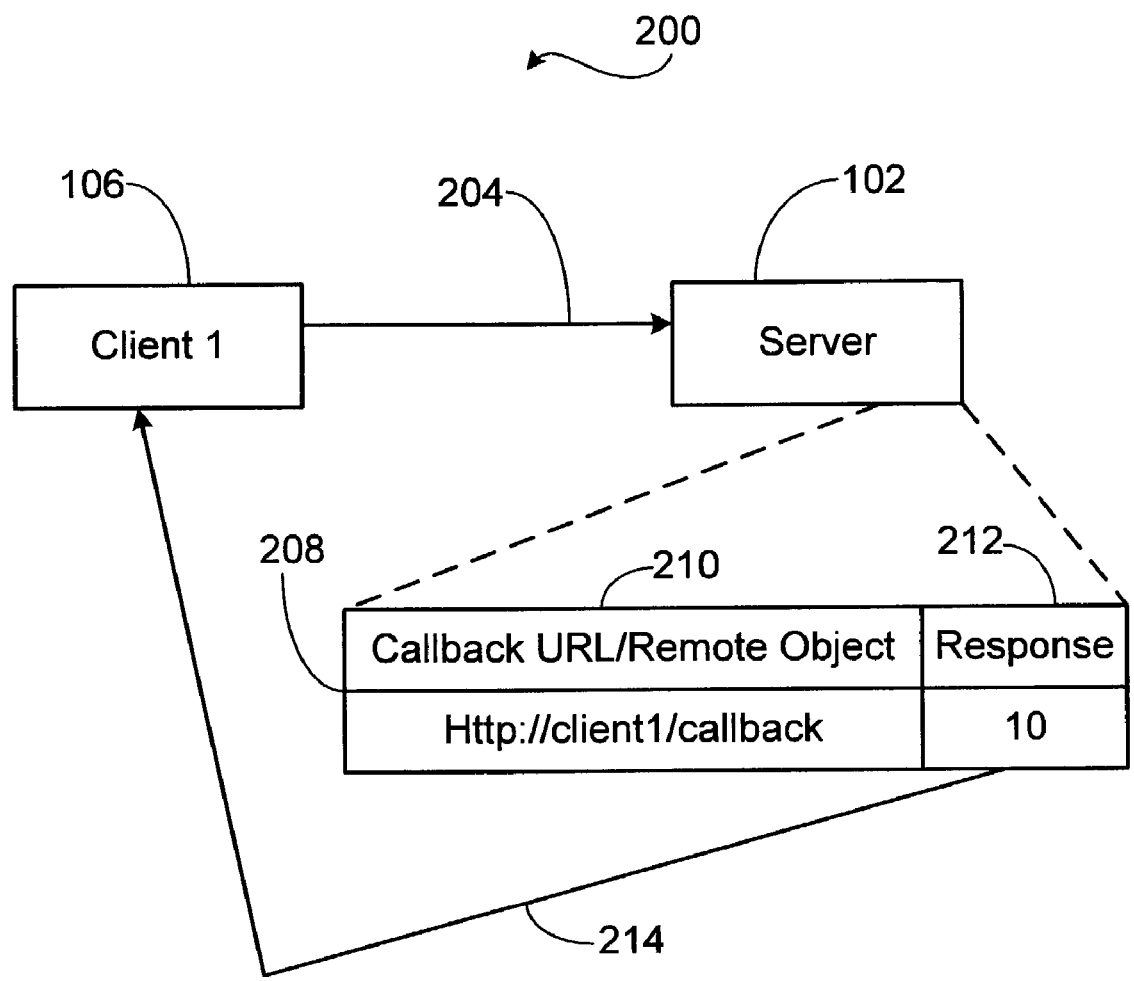
FIG. 2 illustrates a prior art callback mechanism in a typical interaction between a client and a network server.
Figure 3:
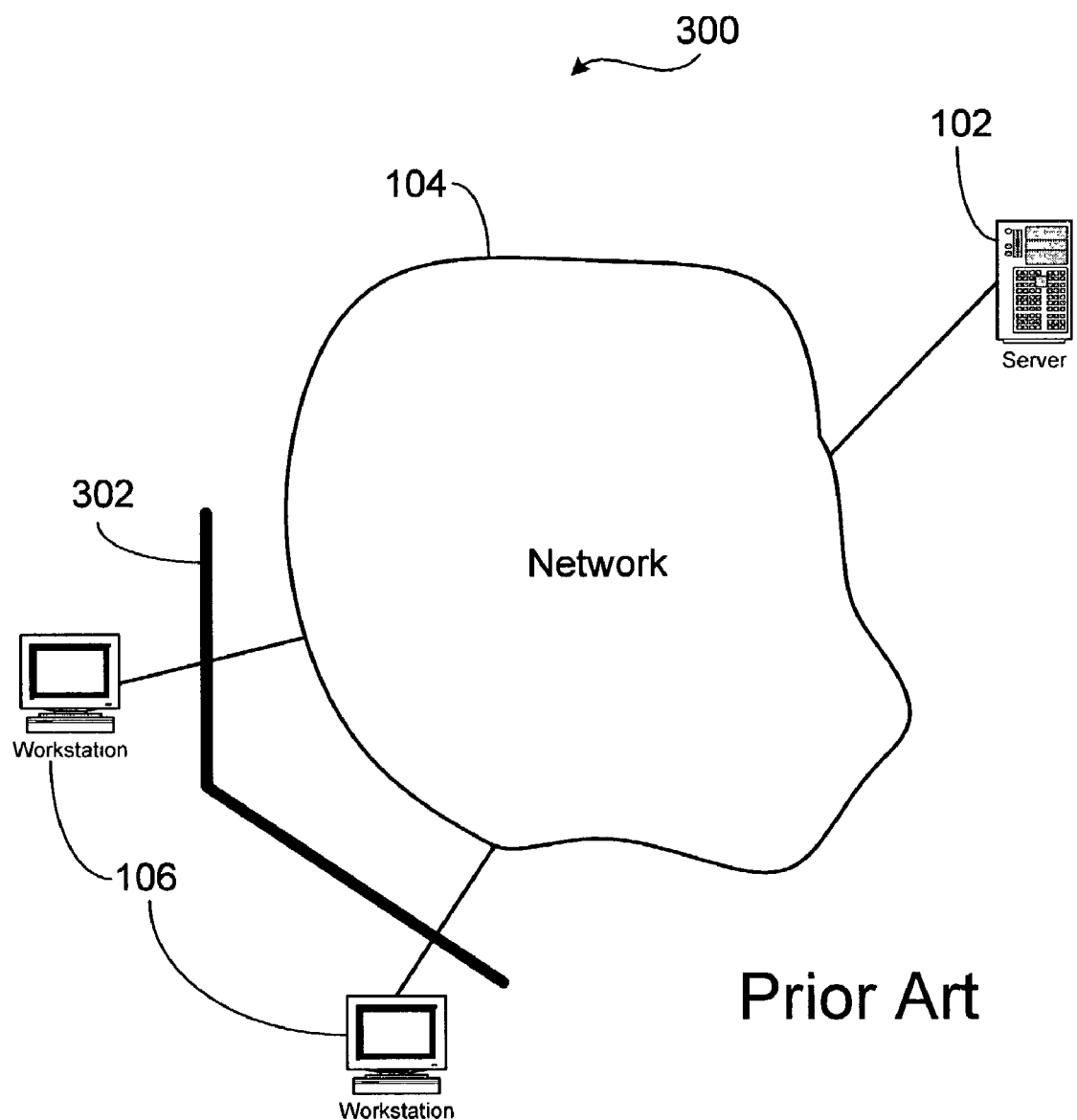
FIG. 3 illustrates a prior art network architecture accessible by clients behind a firewall.
Figure 4:
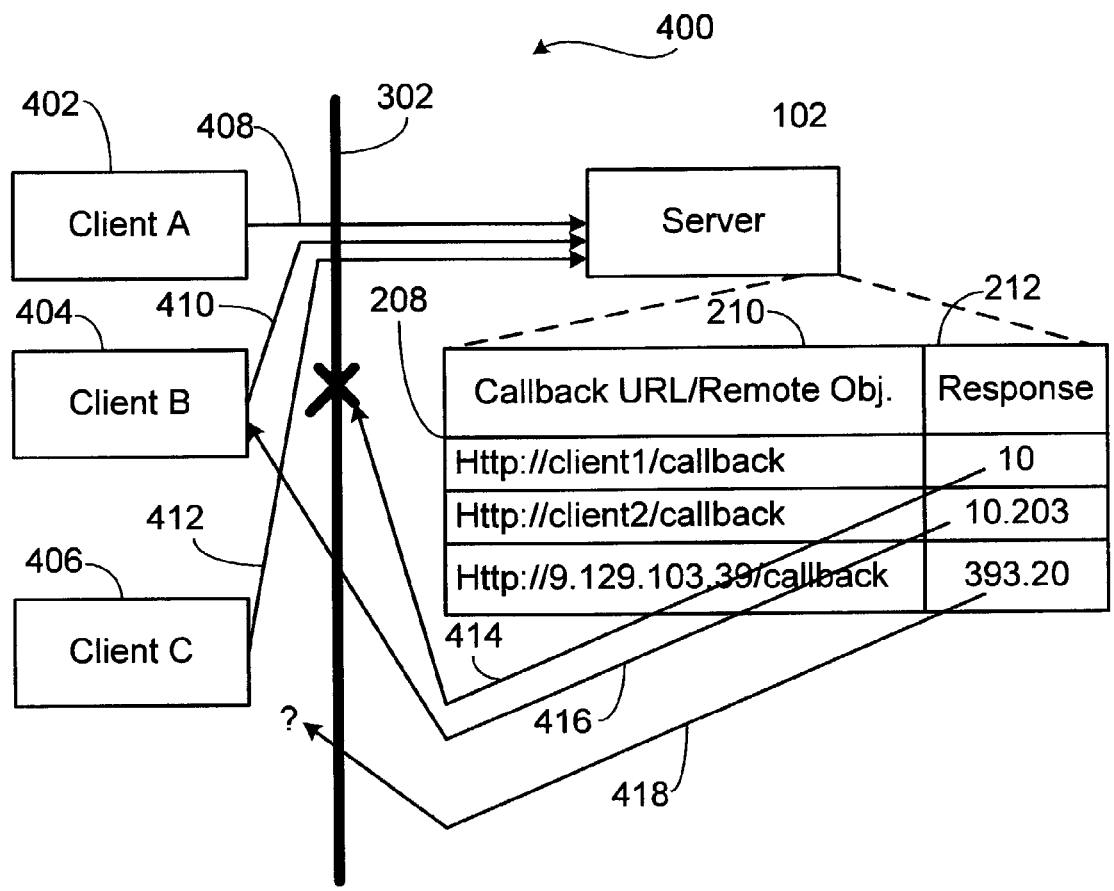
FIG. 4 illustrates prior art callback problems in a network environment with a firewall.
Figure 5:
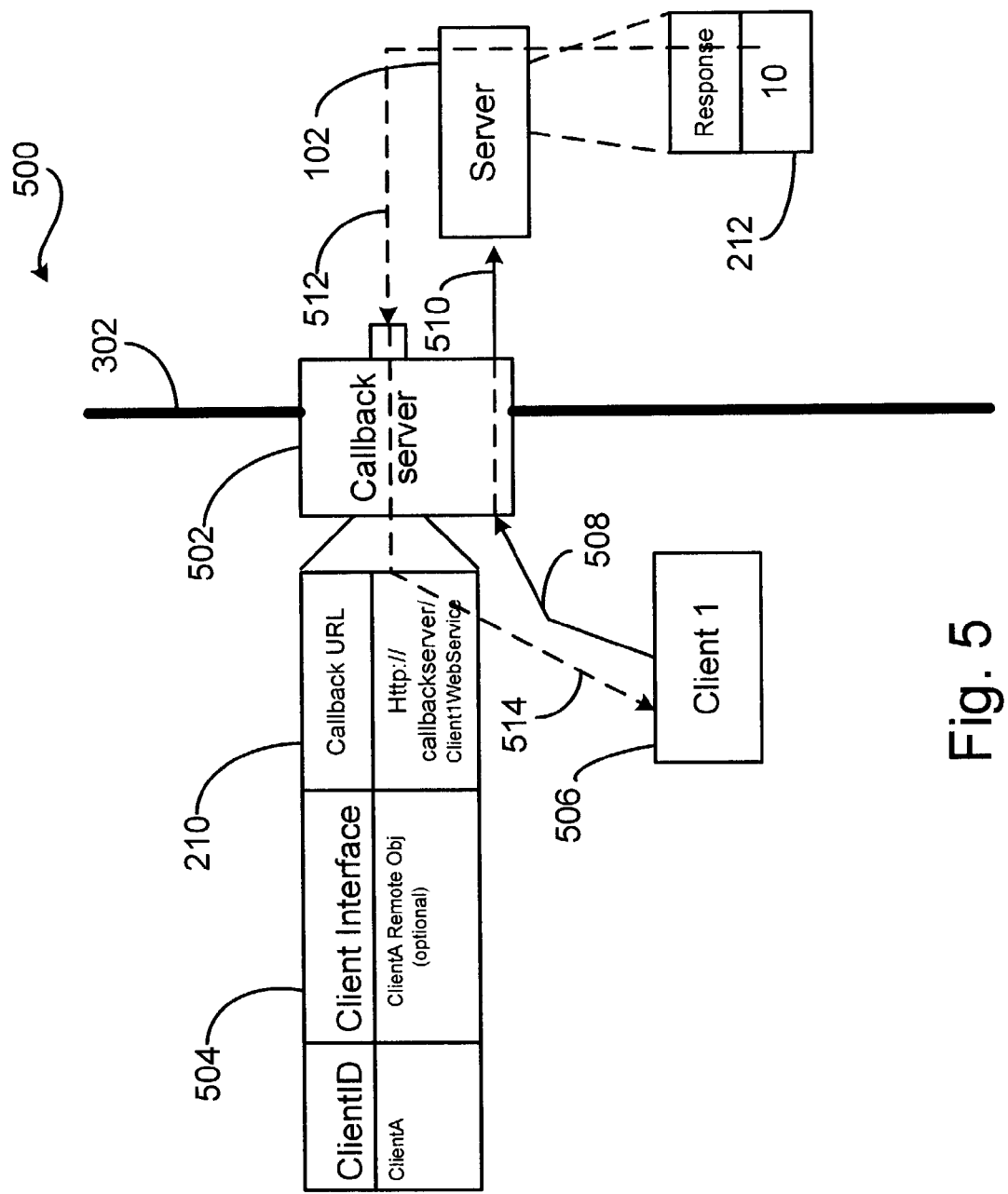
FIG. 5 depicts callback architecture according to the present invention.

The present invention provides a callback server at the edge of a network domain, wherein the callback server is publicly available across network domains and runs an engine that provides a web service container as shown in FIG. 5. The callback server 502 is part of the client network domain and not the domain of the network server 102. A Client 506 within the network domain will register for callbacks with the callback server 502. As part of the client registration with the callback server 502, the client 506 can specify an object 210 to be invoked by the callback server to send the results obtained asynchronously from the network server. This is similar to a remote method invocation (RMI) or a remote procedure call (RPC) and suggests that the client is based on a static IP address and can always be reached within the network domain.

The client would have specified in its registration message to the callback server 502 whether it is on a dynamic IP mechanism. If the client 506 has a fixed static IP address, the callback server 502 forwards the callback 512 in a message 514 to the client 506 as shown in FIG. 5

Figure 6:
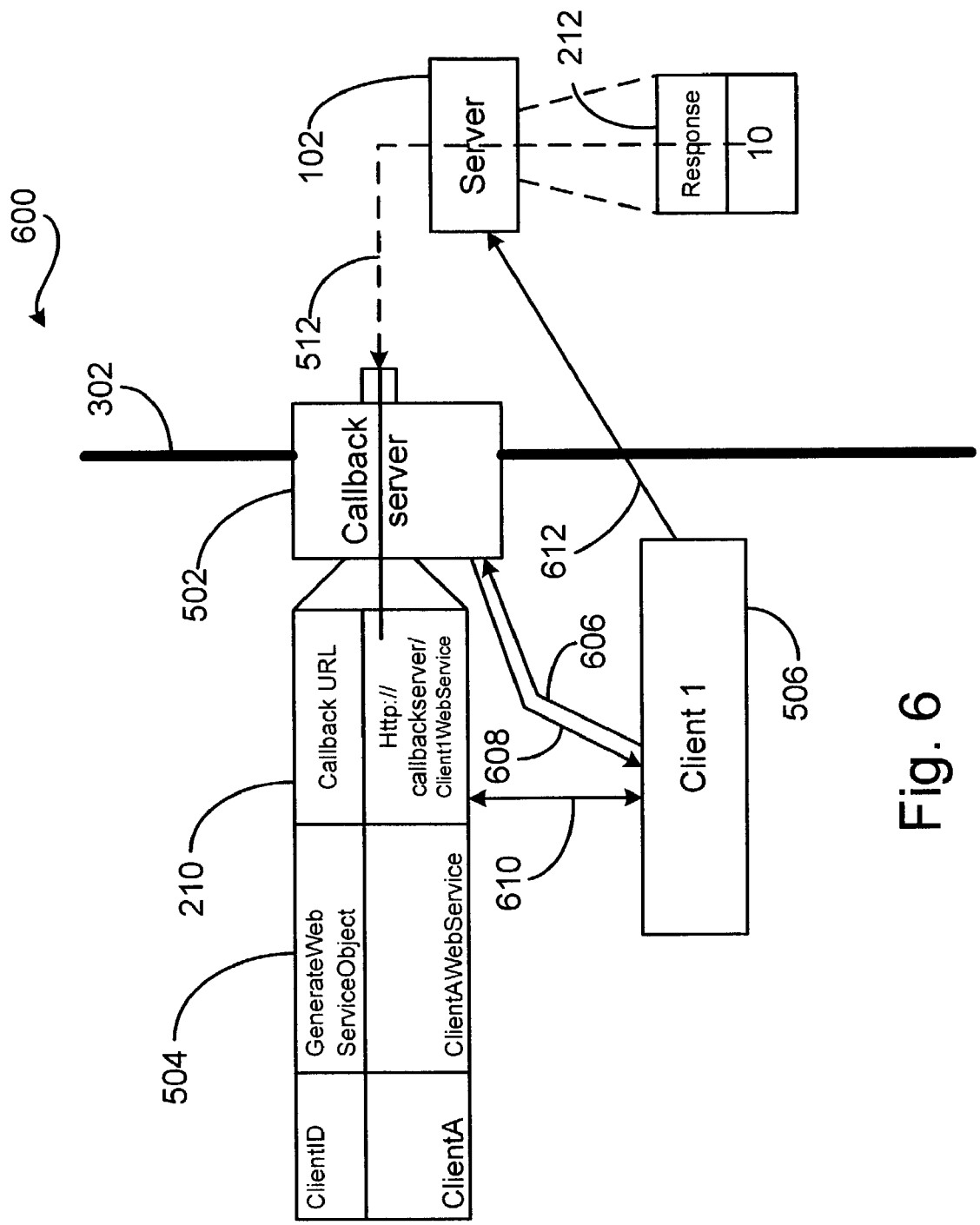
FIG. 6 depicts another callback architecture according to the present invention.

FIG. 6 illustrates a network architecture supporting situations when the client does not have a fixed IP address. In this case, the callback server 502 saves the callback message in a table 504 for the client to poll. The client 506 must poll the callback server 502 with a message 610 to get the results from the network server 102. This polling is relatively less expensive compared to polling the actual network server 102 over the Internet. In most cases, when the client 506 is behind a NAT/firewall 302 but can still be reached through a static IP within the network domain, the polling 610 can be eliminated completely and the callback server 502 can invoke the registered object with the results of the callback. The client on receiving the callback URL from the callback server adds its as the reply-to address to the actual request 612 send to the network server. In FIG. 5, the callback server sends this request to the network server and in FIG. 6 the client sends this request to the network server (default behavior).

FIG. 7 illustrates a client registration process 700. The client 506 sends a callback registration request, which contains the service description of the network server's service that is represented in but not limited to Web Service Description Language (WSDL) to the callback server 502, step 702, and receives an URL from the callback server, step 704. As part of this registration, the client can provide a remote object to be invoked by the callback server. In this case, the registration is particularly complex because SOAP does not allow object references to be passed through it. To circumvent this restriction, a special communication mechanism can be designed between the callback server 502 and the client 506. The client 506 will make a RMI/RPC call to the callback server 502 instead of sending a SOAP message to it. This call will contain as its parameters, the actual network server's URL, the SOAP message to be sent to the service, and, if available, the object to be invoked on callback. However, this would not be the default behavior.

FIG. 8 illustrates a callback server registration process 800. The callback server 502 receives the callback registration request, step 802, and creates a callback web service, step 804, using the service description provided by the client as part of the registration request. A specific URL is created and associated with this dynamically generated web service. The callback server 502 stores this URL as the endpoint address for that particular client interaction in the table 504, step 806, and sends this URL to the client, step 808.

The callback server 502 uses its base URL to produce a URL unique to each client request for callback registration and stores this URL in the table 504. The callback server 502 dynamically generates a web service component (or clones/modifies an existing generic web service component) to listen to requests at this uniquely generated URL. The generated web service component is unique to the particular service being invoked by the client on the network server. If multiple clients register with the callback server to invoke the same service type (possibly on different network servers), the generated web service component may be reused for those clients. This is due to the unique way in which the web service is generated—using the service description of the service hosted on the network server. The client will include this URL as an end point for notifications in its request 612 sent to the network server. In another embodiment, the callback server may forward the client request in a message 510 to the intended network server 102 providing the unique URL as an end point for notifications from the network server 102.

Figures 9, 10:
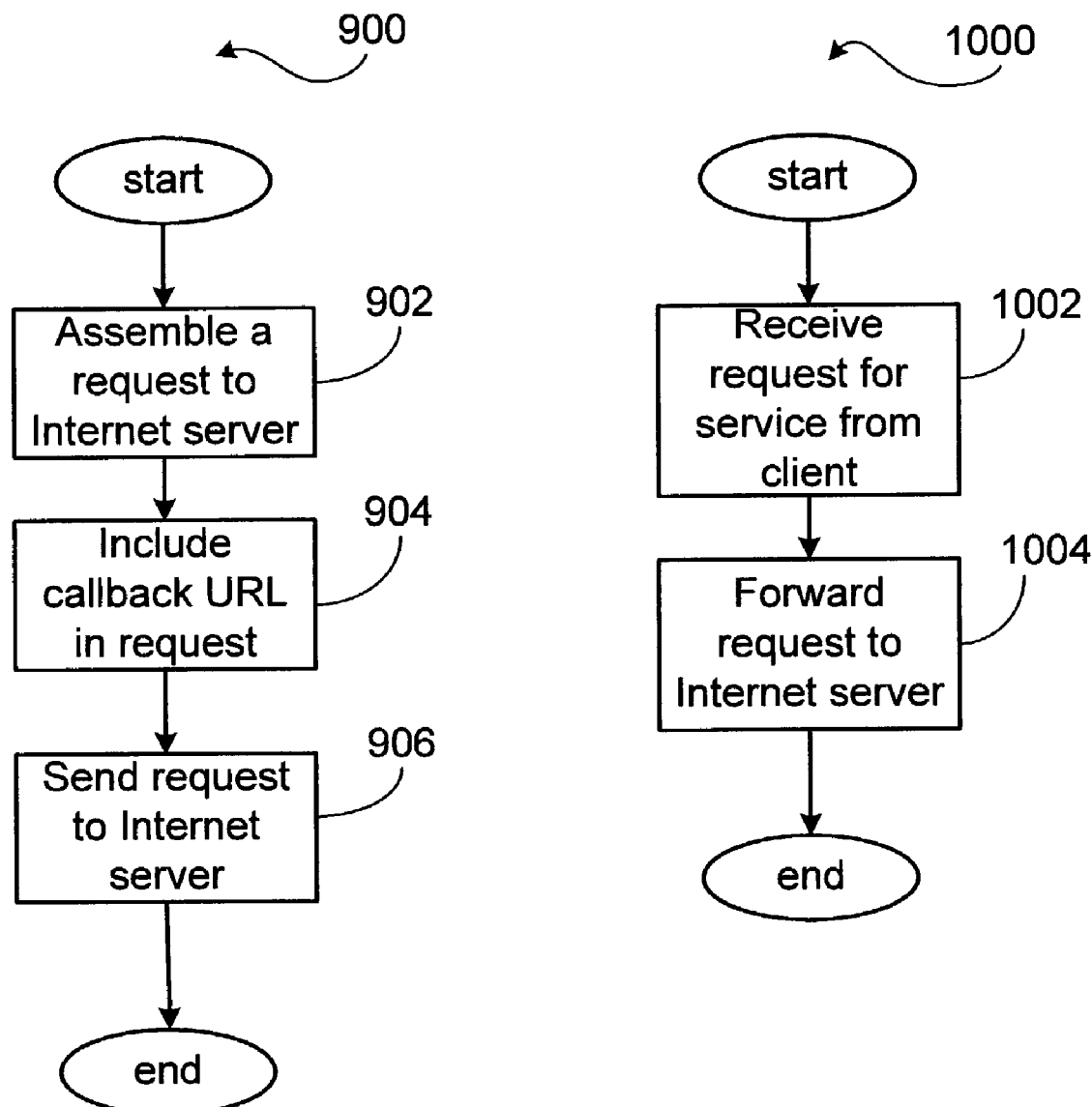
FIG. 9 is a flow chart of a client request process.
FIG. 10 is a flow chart of a callback server request process.

FIG. 9 illustrates a client request process 900. The client 506 assembles a request to the network server, step 902, and includes the URL received from the callback server 502 in the request, step 904. The request with the URL is then sent to the network server, step 906.

FIG. 10 illustrates a callback server request process 1000. The callback server 502 receives the request, step 1002, and forwards to the network server, step 1004. After forwarding the request, the callback server will receive the response from the network server at some later point in time, when the network server invokes the dynamically generated web service published at this URL to deliver the response.

Figure 11:
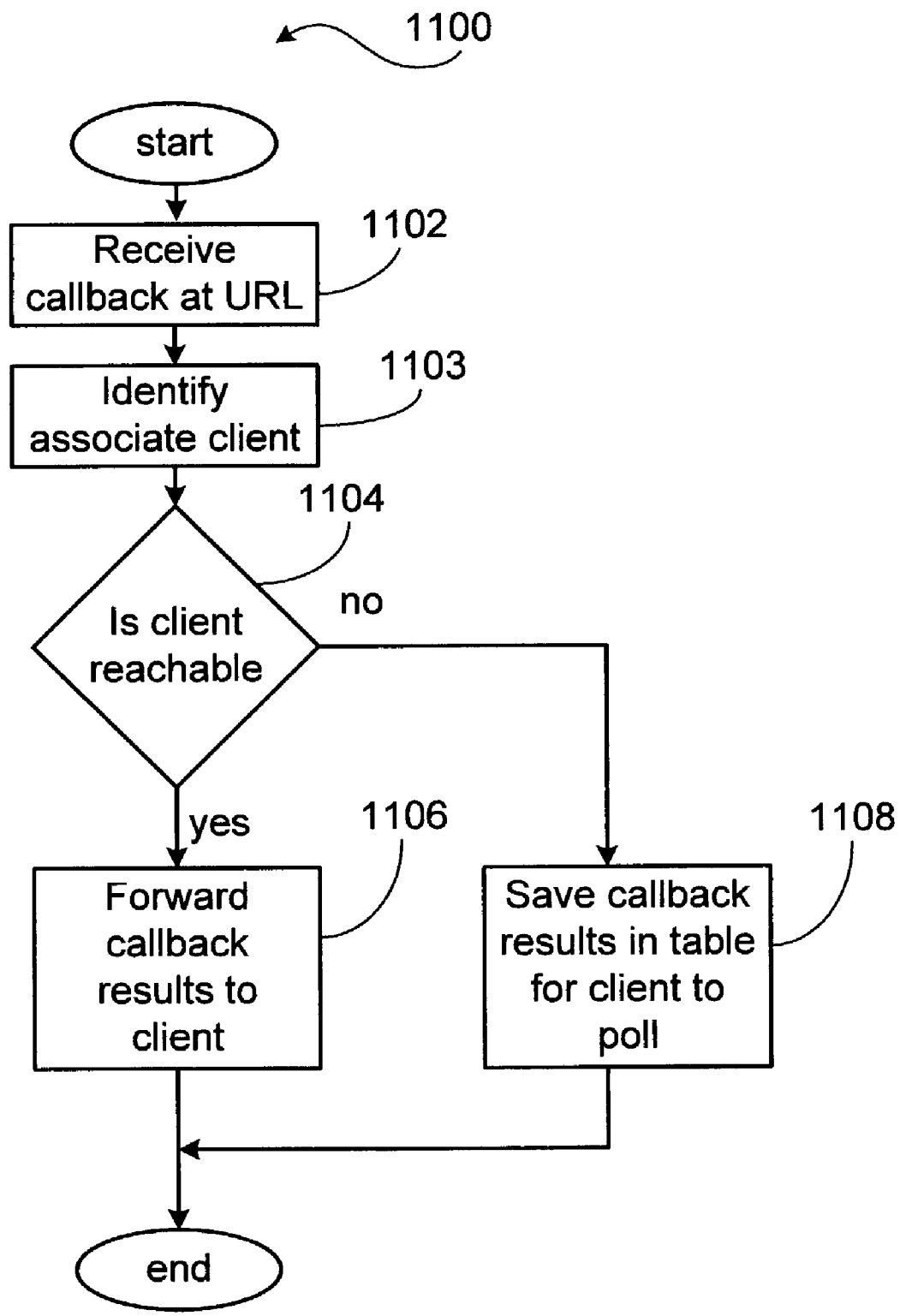
FIG. 11 is a flow chart of a callback server result process.

FIG. 11 illustrates a callback server result process 1100. The callback server 502 receives a callback due to invocation of the dynamically generated web service published at the URL, step 1102, and identifies an associated client, step 1103. If the client is reachable, the client will not poll the callback server 502 continuously. Since the callback server 502 has registered a web service endpoint URL with the network server 102, the network server 102 will invoked the web service published at the callback server by sending an appropriate SOAP message. This web service at the specific URL on receiving this callback 512 can send it back to the client for which it was generated, step 1106. This web service is given the details of the client when it is created.

On the other hand, if the client has not specified in its registration message whether it has a fixed IP address, the worst case scenario is assumed—the client is assumed to be dynamic IP based and cannot be reached from the callback server 502. In this case, the web service generated for that client on the callback server 502 saves the callback in a table 504 for the client to poll later, step 1108.

In an alternate embodiment, the callback server 502 can cache callback requests. If one or more clients register for the same callback from the same network server for the same request with the same parameters (in a simple world this can be determined by looking at the eXtended Markup Language (XML) payload of the SOAP requests put forth by the clients to send to the same server), the callback server 502 can generate a single web service and provide the same callback service URL for the network server 102 to invoke and indicate to the service (when creating it), that when it receives the results it must provide it for the callback server to hold for multiple clients to poll or it must invoke multiple objects registered by different clients. This is accomplished by mapping multiple clients to the same callback URL in the table 504.

In yet another embodiment, the scalability is enhanced through use of multiple callback servers 502 within the network domain. These callback servers share information about the various clients registered for callback. The clients can thus register with any of these callback servers. However, only one unique web service will be generated per client and the associated URL address will be registered for callback with the actual network server 102. On receiving the callback the web service will send the results back to the client, if the client has registered a remote object, or propagate the values to all the other callback servers, which will retain them for any client to poll. Alternately, when the web service is initially created, it can inform all other callback servers in the domain that the client is being registered for callback at this particular server. In any case, when the client polls any one of the callback servers it will either find the results there (former case) or, in the latter case, the callback server that the client is polling will check the callback server that actually created the service for this client to see if there are any callback results for the client.

In this embodiment, the actual call generation to the network server 102 is done by the client. The client 506 in this case would act as follows. When the client realizes it needs to request a callback, it will send a message to the callback server 502 and register with it. In response to this request, the callback server 502 follows the actual process of creating a web service to act as an endpoint for the callback and provides the client with the unique URL of this web service. The client will then make a regular SOAP call to the network server providing the URL of the service generated on its behalf on the callback server. The rest of the above in the context of polling and receiving the callback response remains the same.

In the context of web services, the response received from the network server by the web service established at the callback server will be a SOAP message. The callback server need not do any manipulations with this data. It will only hold the SOAP message and pass it on back to the client when the client polls for it, or get it across to the client through some other mechanism.

In yet another embodiment, the web service may do some preprocessing of callback results. For example, the web service may deserialize the XML payload that is within the SOAP message received during the callback into native objects that can be used directly by the client. The idea is that the callback servers are typically powerful machines and they can preprocess the results and provide directly usable objects to the client. When the client requests the web service to act on its behalf, it provides the description of the Internet service it will invoke. The description is through use of, but not limited to, Web Services Description Language (WSDL), which can be obtained from a third party directory, such as Universal Description and Discovery and Integration (UDDI) registry. Using this WSDL description, the web service can figure out what results it will be receiving and how to deserialize them.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A method for providing asynchronous callbacks from a network server to a client that is unreachable by the server, the method comprising the steps of:

registering a callback request from the client with a first callback server that has its own first network address and that is not part of the network server and that is configured to receive a callback request from the client and create a web service endpoint URL (Uniform Resource Locator) address corresponding to the callback request, the web service endpoint URL address being based on the first network address of the first callback server;

creating a web service at the first callback server, the web service being based on interface description of service provided by the network server;

generating a second network address for the web service based on the web service endpoint URL address;

sending the second network address to the client;

receiving an asynchronous callback at the second network address; and making the asynchronous callback available to the client.

2. The method of claim 1 further comprising the step of forwarding the asynchronous callback to the client.

3. The method of claim 1 further comprising the step of receiving polling requests from the client.

4. The method of claim 1 further comprising the step of preprocessing the asynchronous callback.

5. The method of claim 1 further comprising the step of distributing the second network address to a second callback server.

6. The method of claim 1 further comprising the step of using the first network address of the first callback server as base.

7. The method of claim 1 further comprising the step of receiving a third network address associated with the client.

8. The method of claim 1 further comprising the steps of:
receiving a service request from the client at the callback server; and
forwarding the service request from the callback server to the network server.

9. The method of claim 8, wherein the callback service request is a SOAP (Simple Object Access Protocol) message.

10. The method of claim 1, wherein the network address is a URL address.

11. The method of claim 1 further comprising the steps of:
obtaining service provider's interface description from a registry; and
sending at least a portion of the service provider's interface description to the callback server.

12. The method of claim 11, wherein the service provider interface description is in WSDL (Web Service Description Language).

13. The method of claim 11, wherein the registry is Universal, Description and Discovery and Integration (UDDI) registry.

14. A method for providing asynchronous callbacks from a network server to a client that is unreachable by the network server, the method comprising the steps of:
registering a callback request with a first callback server that is different from the network server;
creating a web service at the first callback server;
generating a network address for the web service;
distributing the network address and information on the callback request from the first callback server to a plurality of callback servers, each of the plurality of callback servers being different from the network server;
sending the network address from the callback server to the client;
receiving an asynchronous callback at a callback server associated with the network address; and
making the asynchronous callback available to the client.

15. The method of claim 14 further comprising the step of checking the first callback server for the asynchronous callback.

16. The method of claim 14 further comprising the step of processing polling messages from the client.

17. The method of claim 14 further comprising the step of distributing information of a generated web service.

18. A system for providing asynchronous callbacks from a network server to a client that is unreachable by the network server, the system comprising:
a plurality of clients that are separated from the network server by a network isolation mechanism; and
a callback server, different from the network server, that is configured to receive asynchronous callbacks from the network server and to communicate the asynchronous callbacks with the plurality of clients, the callback server having a base network address and being configured to:
generate a network address based on the base network address,
create a web service based on a given service description,
associate the web service with the network address, and
receive the asynchronous callbacks at the network address.

19. The system of claim 18, wherein the callback server is further configured to preprocess the asynchronous callbacks.

20. The system of claim 18, wherein the callback server is further configured to receive a registration request from at least one client.

21. The system of claim 20, wherein the registration request includes a network address for the at least one client.

22. The system of claim 18, wherein the callback server is further configured to send the network address to at least one client.

23. The system of claim 18, wherein the callback server is further configured to process polling messages from at least one client.

* * * * *